United States Patent Office 2,849,328
Patented Aug. 26, 1958

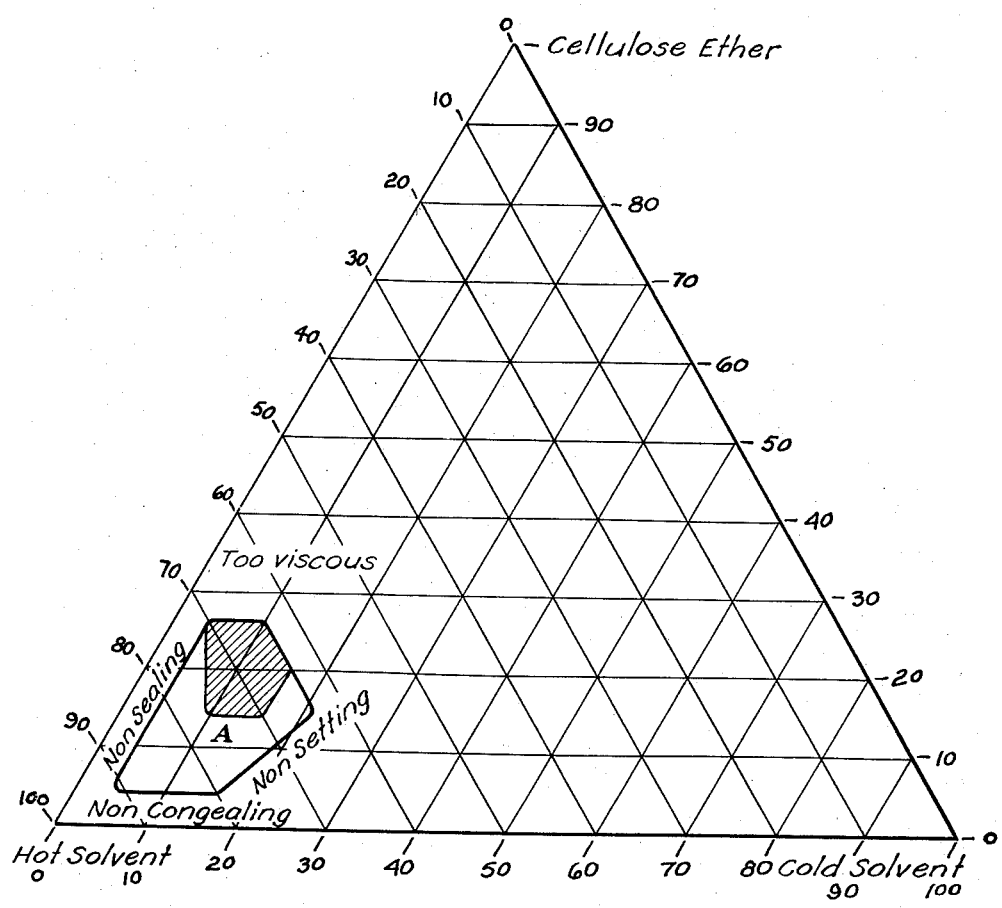

2,849,328

COLD-SEALING WATER-SOLUBLE THERMO-PLASTIC CELLULOSE ETHER COMPOSITION

Richard W. Swinehart and George K. Greminger, Jr., Midland, and Miles A. Weaver, Ithaca, Mich., assignors to The Dow Chemical Company, Midland, Mich., a corporation of Delaware Application November 25, 1953, Serial No. 394,250

6 Claims. (Cl. 106—176)

This invention relates to thermoplastic compositions of water-soluble cellulose ethers which are themselves sufficiently thermoplastic to melt without decomposition. It relates further to those thermoplastic compositions which may be sealed in the cold.

A method for the fabrication by thermal means of semi-rigid articles, such as pharmaceutical capsules, from water-soluble cellulose ethers, has long been desired. Thermoplastic compositions made from non-thermoplastic water-soluble cellulose ethers have been disclosed, but they require such large amounts of plasticizer that rigid articles cannot be produced except by forming very thick sections. When such articles were desired, it was necessary to cast or to dip the ethers from an aqueous solution, usually containing a small amount of a humectant, and subsequently to evaporate the water. Because of the unique solubility characteristics of most of the cellulose ethers the fabrication of shaped articles from aqueous solutions is very difficult to control. In addition, when it is desired to make soft pharmaceutical capsules, it is necessary that the composition form a firm seal at low temperatures so as not to warp the dies. All of the known thermoplastic cellulose ether compositions require an elevated temperature to form such seals. It would be desirable if existing molding equipment and normal hot molding process could be utilized to form such articles.

It is an object of this invention to provide new and improved thermoplastic compositions consisting chiefly of water-soluble cellulose ethers which are themselves thermoplastic.

It is a still further object to provide compositions which may be formed into semi-rigid articles using conventional thermal fabricating machines.

Another object is the provision of compositions which will seal to themselves with applied pressure at ordinary temperatures.

The above and related objects are accomplished by using composition consisting of certain water-soluble alkyl hydroxyalkyl cellulose ethers together with a plasticizer which is a solvent for the cellulose ether at elevated temperatures and also with a solvent for the ether at low temperatures.

The cellulose ethers which are useful in carrying out the invention are those alkyl hydroxyalkyl cellulose ethers in which the alkyl group contains from 1 to 3 carbon atoms and in which the hydroxyalkyl group contains from 2 to 3 carbon atoms and which melt at a temperature appreciably below their decomposition temperature and which are soluble in water and certain organic solvents. Such ethers as the methyl hydroxyethyl and methyl hydroxypropyl ethers of cellulose, when etherified to an extent as will be later described, are particularly useful.

The cellulose ethers may be prepared by known two-step processes, but it is preferred to employ a one-step process. In the latter process, cellulose is treated with from 30 to 60 percent aqueous caustic soda solution to give an alkali cellulose with a NaOH/cellulose ratio from 0.7 to 1.5. The alkali cellulose is mixed with from 1.1 to 2.0 parts of methyl chloride per part of cellulose and with 0.45 to 0.50 parts of propylene oxide, or its molecular equivalent of ethylene oxide, per part of cellulose at a temperature below 40° C. for a short time, followed by reaction at 60° C. or higher until etherification is substantially complete.

It is difficult to determine the proportions and amounts of each substituent in a mixed cellulose ether, especially in one prepared in a single step reaction. When the mixed ethers useful in this invention are examined with infrared techniques, they are found to have an absorption ratio of oxygen-hydrogen bonds to carbon-hydrogen bonds (OH/CH) of 0.88 to 1.05. (OH/CH) ratio is the ratio of the optical density of a cellulose ether film measured at 2.9 microns to the optical density of the same film measured at 3.4 microns. By way of contrast, the commercially available non-thermoplastic methyl hydroxypropyl celluloses are found to have an OH/CH ratio of 1.15 to 1.25. It is easier to characterize the ethers by some physical property, such as melting point of the ether or gel point of its water solutions. In the case of this invention, the existence of the desired degree of etherification is best determined by measuring the softening, melting, and decomposition temperatures of the ether product. Those temperatures are easily determined by using a melting bar which has progressively increasing temperatures along its length. Films of constant thickness are made up and small pieces placed at varying points on the melting bar. To be useful here, the mixed ethers should have a spread of at least 10 and preferably 20 or more centigrade degrees between melting and decomposition temperatures.

The viscosity grades of the cellulose ether should preferably be below 100 centipoises. It is difficult to dissolve sufficient amounts of the higher viscosity grades to impart useful properties to shaped articles. When large enough amounts are dissolved, the viscosity of the solution is so high that casting and dipping operations are impossible to carry out.

The cold solvents which are useful in the compositions of this invention are those solvents which will dissolve the cellulose ether in the necessary concentration at a temperature under 50° C. Typical examples of such solvents are water, ethylene carbonate, propylene carbonate, and a 50 percent aqueous solution of gluconic acid.

The hot solvents or plasticizers that may be employed are those which will dissolve the cellulose ether at the necessary concentration at elevated temperatures such as 100° C. or higher. Several hot solvents for the water-soluble alkyl cellulose ethers of this invention are disclosed in the concurrently filed applications of one or more of the present applicants, Serial Numbers 394,326 (now U. S. Patent Number 2,810,659); 394,476, 394,482 and 394,506, all dated November 25, 1953. Included among the hot solvents disclosed in those applications are alkyl lactates, monoalkyl ethers of glycols, alkyl glycolates, and mixtures of alkylene glycols and esters of citric acid.

In addition to the above-described requirements, it is necessary that the cold solvent and the plasticizer be compatible with one another. Combinations of plasticizers and combinations of cold solvents may be used providing that they are all compatible, when special properties are desired in the shaped articles.

The single figure of the drawing is a composition chart illustrating the three component system of the invention.

The thermoplastic compositions of this invention when using viscosity grades of cellulose ether greater than 50 cps. contain at least 4 and not more than 26 per cent of the water-soluble cellulose ether, at least 4 and not more than 21 per cent of the cold solvent, and at least 64 and not more than 91 per cent of the hot solvent, all as further defined and limited by the area A enclosed by the solid line on the accompanying composition chart. The preferred compositions are represented by the shaded area on the diagram and contain from 14 to 26 per cent of the water-soluble cellulose ether, from 4 to 16 per cent of the cold solvent, and from 64 to 76 per cent of the hot solvent. With larger amounts of cellulose ether, the solutions are too viscous to be employed in dipping and casting operations and with less than 4 per cent cellulose ether the compositions are non-congealing. With more than 21 per cent of the cold solvent, the compositions are non-setting, and, with less than 4 per cent cold solvent, they are non-sealing.

When the lower viscosity grades of cellulose ethers (less than 50 cps.) are used, greater amounts of cellulose ether may be used. The extent to which area A on the annexed drawing may be enlarged when such ethers are used is represented as the area within the dotted line. Thus, up to 35 per cent of the water-soluble cellulose ether may be used before the solutions become too viscous for dipping and casting operations.

It has been found that the compositions of this invention may be sealed at room temperature using pressure alone. Prior compositions required the use of elevated temperatures, pressure, adhesives, or combinations of the three.

The utility of the compositions will be more apparent from the following illustrative examples.

Example 1

A cellulose ether composition was prepared consisting of 15 per cent of a methyl hydroxypropyl cellulose (OH/CH ratio 0.98) prepared by the method previously described, 70 per cent propylene glycol, and 15 per cent propylene carbonate. The mixture was heated to 130° C. with agitation to obtain substantially complete solution. The solution was cast onto a glass plate and within a few seconds had set up sufficiently to be stripped from the plate.

The resulting sheet was doubled over upon itself and a round metal disc rolled over the sheet at room temperature. The disc simultaneously sheared the sheet and sealed the sheared edges together.

By way of contrast when a similar composition was prepared consisting of the same cellulose ether, propylene glycol, and glycerin and a sheet cast, the resulting sheet could not be sealed to itself at room temperature.

Example 2

A composition similar to that of Example 1 was prepared using water in place of propylene carbonate and a sheet cast. When this sheet was doubled over and the disc rolled over it at room temperature, it was sheared and the edges sealed to each other.

Example 3

When a 50 per cent aqueous solution of gluconic acid was used in place of propylene carbonate in the composition of Example 1 and a sheet cast, the sheet was readily sheared and sealed at room temperature by the rolling disc.

Example 4

Several compositions were prepared in a manner similar to that of Example 1 using varying amounts of a methyl hydroxypropyl cellulose ether, a hot solvent, and a cold solvent. Sheets were attempted to be cast from each of the compositions. Where sheets were obtained, they were doubled over and the disc rolled over them. The results of these tests are given in Table 1.

TABLE I

| Sample | Percent methyl hydroxypropyl cellulose ether | Percent water | Percent propylene carbonate | Percent 50% gluconic acid | Percent propylene glycol | Remarks |
|---|---|---|---|---|---|---|
| 1 | 1 | 5 | | | 94 | Non-congealing. |
| 2 | 1 | 39 | | | 60 | Do. |
| 3 | 35 | 5 | | | 60 | Too viscous to cast. |
| 4 | 3 | 5 | | | 92 | Non-congealing. |
| 5 | 5 | 5 | | | 90 | Sealed. |
| 6 | 30 | 5 | | | 65 | Too viscous to cast. |
| 7 | 25 | 5 | | | 70 | Sealed. |
| 8 | 15 | 39 | | | 46 | Non-setting. |
| 9 | 15 | 25 | | | 60 | Do. |
| 10 | 25 | 10 | | | 65 | Sealed. |
| 11 | 25 | 15 | | | 60 | Too viscous to cast. |
| 12 | 5 | 20 | | | 75 | Non-setting. |
| 13 | 10 | 20 | | | 70 | Do. |
| 14 | 20 | 15 | | | 65 | Sealed. |
| 15 | 15 | 3 | | | 82 | Non-sealing. |
| 16 | 15 | | 20 | | 65 | Sealed. |
| 17 | 5 | 15 | | | 80 | Do. |
| 19 | 15 | 10 | | | 75 | Do. |
| 20 | 15 | | | 15 | 70 | Do. |

The compositions of this invention have been found to be especially useful in preparing soft capsules for pharmaceutical preparations.

We claim:

1. A thermoplastic composition consisting essentially of (1) a water-soluble alkyl hydroxyalkyl cellulose ether; (2) a compound which will dissolve said cellulose ether only at temperatures over 100° C.; and (3) a compound which will dissolve said cellulose ether only at temperatures below 50° C.; all in proportions represented by the enclosed area on the annexed drawing.

2. The composition claimed in claim 1 in which the cellulose ether is a water-soluble methyl hydroxypropyl cellulose.

3. The composition claimed in claim 1 wherein the cold solvent is water.

4. The composition claimed in claim 1 wherein the cold solvent is ethylene carbonate.

5. The composition claimed in claim 1 wherein the cold solvent is propylene carbonate.

6. The composition claimed in claim 1 wherein the cold solvent is a 50 per cent aqueous solution of gluconic acid.

References Cited in the file of this patent

UNITED STATES PATENTS

| | | |
|---|---|---|
| 1,907,891 | Steimmig et al. | May 9, 1933 |
| 1,995,291 | Carothers | Mar. 26, 1935 |
| 2,381,511 | Muskat | Aug. 7, 1945 |
| 2,442,864 | Schneider | June 8, 1948 |
| 2,721,142 | Shinn et al. | Oct. 18, 1955 |

FOREIGN PATENTS

| | | |
|---|---|---|
| 534,852 | Germany | Oct. 2, 1931 |
| 689,705 | Great Britain | Apr. 1, 1953 |

OTHER REFERENCES

Gloor et al., "Jour. Ind. and Eng. Chem." 42, 2150–3, 1950.